UNITED STATES PATENT OFFICE.

GIDEON W. EMIGH, OF FORT COLLINS, COLORADO.

HOG-CHOLERA REMEDY.

SPECIFICATION forming part of Letters Patent No. 369,281, dated August 30, 1887.

Application filed November 4, 1886. Serial No. 217,976. (No specimens.)

*To all whom it may concern:*

Be it known that I, GIDEON W. EMIGH, a citizen of the United States, residing at Fort Collins, in the county of Larimer and State of Colorado, have invented certain new and useful Improvements in Hog-Cholera Remedies, of which the following is a specification.

This invention relates to an improved composition of matter for the prevention and cure of hog-cholera; and it consists of the following ingredients, viz: copperas, carbolic acid, common salt, pine-tar, kerosene-oil, and sulphur, which are combined in the manner and proportions as follows: For one gallon of the composition take copperas, two pounds; carbolic acid, two ounces; common salt, one and one-half pound; pine-tar, one pound; kerosene-oil, two pints; sulphur, one pound.

A solution is first made by boiling the copperas and salt in a sufficient quantity of water until dissolved. When the solution is thoroughly effected, the pine-tar is added, and the compound is again boiled until the same is thoroughly combined with the solution. The sulphur is then added and the boiling continued for about ten minutes, after which the carbolic acid and kerosene are added and the whole agitated until a thorough and uniform combination of all of the ingredients is effected. The composition is then allowed to cool, when it is ready for use and can be put up in any convenient form.

The composition may be administered in convenient doses at proper intervals, as may be indicated, by the condition of the animal; but I prefer to employ it in the following manner: To one barrel of slop composed of shorts and chop add one gallon of the compound, and feed four times each day for two days. Then reduce to one-half strength, using one-half gallon to one barrel of slop.

I am aware that each ingredient herein named has been heretofore used for the purpose set forth, and I therefore disclaim the use of such ingredients separately.

Having thus described my invention, what I claim, and desire to secure by Letters Patent of the United States, is—

The within-described hog-cholera remedy, consisting of copperas, carbolic acid, common salt, pine-tar, kerosene-oil, and sulphur, in about the proportions specified.

In testimony whereof I affix my signature in presence of two witnesses.

GIDEON W. EMIGH.

Witnesses:
NEWTON G. VOSBOX,
ALONZO P. SICKMAN.